April 12, 1960 H. W. CHAPMAN ET AL 2,932,530
BICYCLE WHEEL SUSPENSION

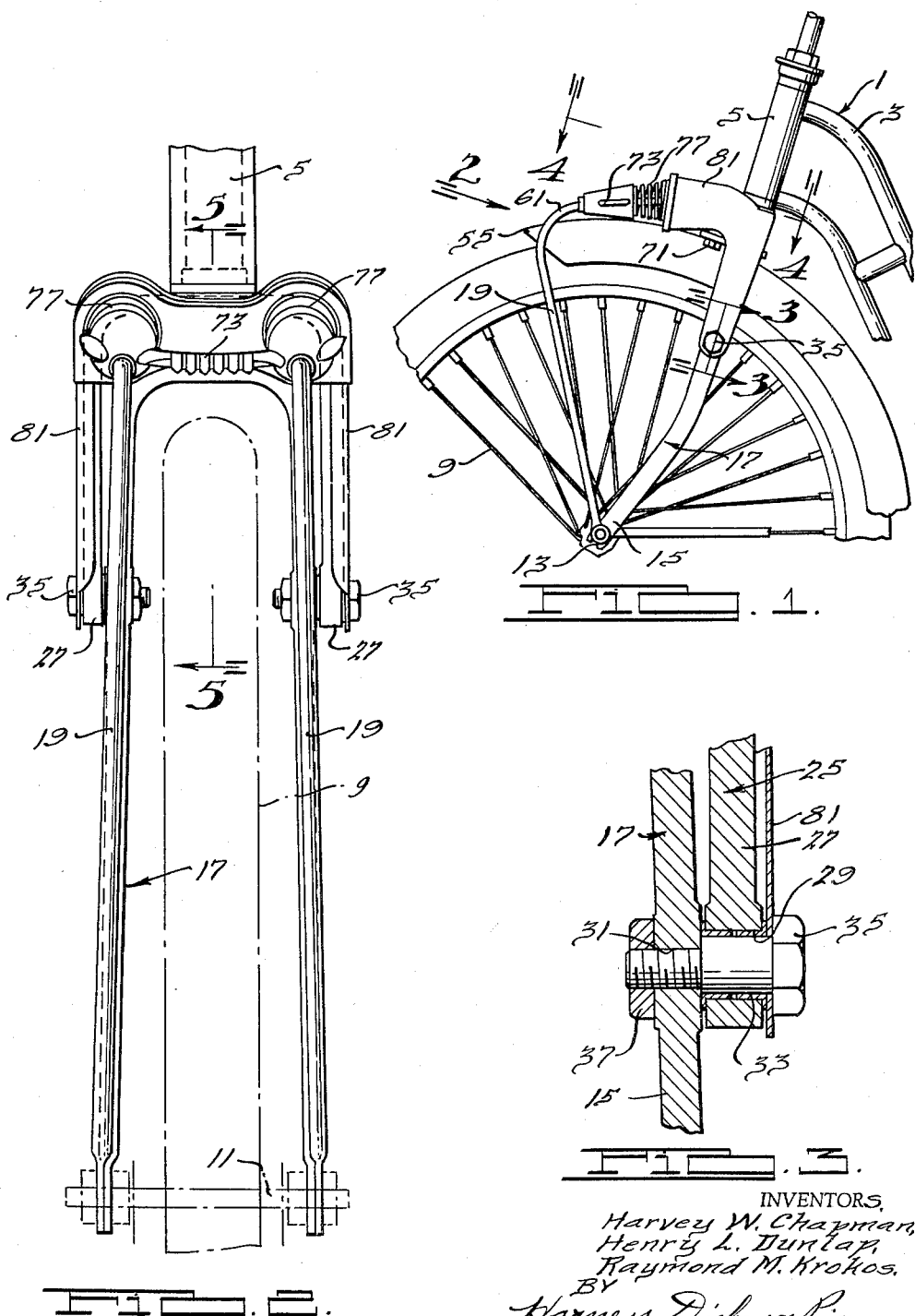

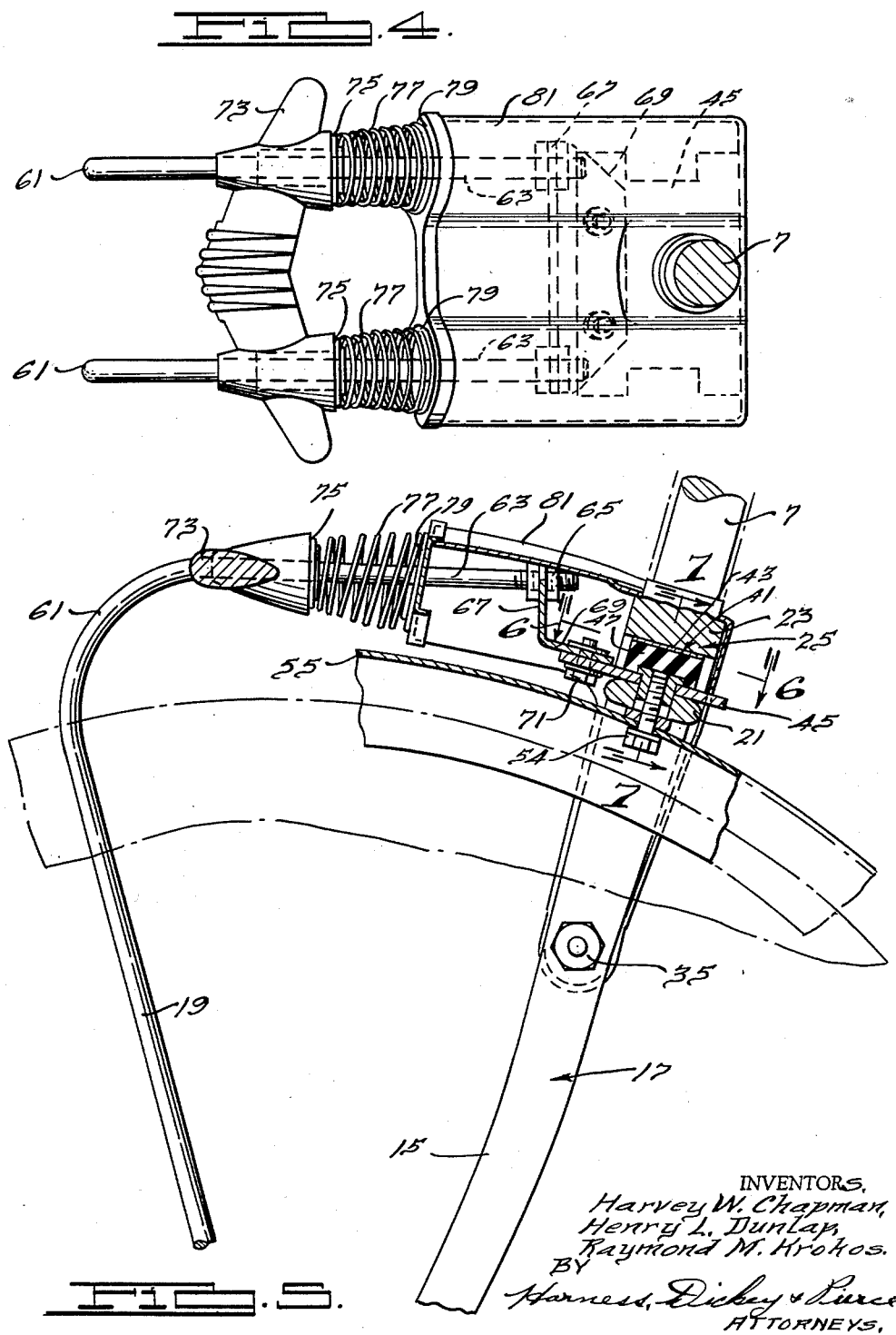

Filed Feb. 26, 1957 3 Sheets-Sheet 3

INVENTORS.
Harvey W. Chapman,
Henry L. Dunlap,
Raymond M. Krohos.
BY Harness, Dickey & Pierce
ATTORNEYS.

United States Patent Office 2,932,530
Patented Apr. 12, 1960

2,932,530

BICYCLE WHEEL SUSPENSION

Harvey W. Chapman, Detroit, Henry L. Dunlap, Dearborn, and Raymond M. Krokos, Detroit, Mich., assignors to Evans Products Company, Plymouth, Mich., a corporation of Delaware Application February 26, 1957, Serial No. 642,577

12 Claims. (Cl. 280—276)

This invention relates to the mounting of bicycle wheels.

It is the object of this invention to provide a bicycle wheel mounting which will resiliently cushion or absorb shocks and bumps so that they will not be transmitted into the bicycle frame.

It is an important object of the invention to provide a shock mounting for bicycle wheels that has a variable spring rate which automatically adjusts itself to optimum condition to dampen and cushion impacts of various magnitudes and frequencies such as encountered in riding a bicycle over widely varying terrains or in running into obstacles of various sizes and shapes.

It is also an object of the invention to provide an efficient shock mounting for a bicycle wheel which will support riders of widely varying weights, which will return the wheel to its original position after impact, and which will cushion rebound.

It is another object of this invention to provide a shock mounting for bicycle wheels which is of such construction as to be attractive in appearance as well as efficient in operation.

In preferred form, a bicycle wheel mounting in accordance with the invention employs rubber and coil springs as the principal elements to dissipate shock loads on the wheel of a bicycle. These are arranged to act between the frame of the bicycle and a movable part connected with the bicycle wheel and will absorb impact loads acting in all directions on the bicycle wheel. In the preferred arrangement for the front wheel of a bicycle, there are upper and lower forks to support the wheel, the lower fork carrying the wheel axle and being pivoted to the upper fork which is attached to the frame of the bicycle, preferably at the steering post. A pad of rubber is located between and connected to the two forks so that any tendency of the forks to move relatively to each other is resisted by the rubber. In addition a pair of coil springs is mounted on truss rods or struts which extend upwardly on opposite sides of the wheel and are connected to the inner fork, the springs bearing at one end upon a depending portion of the upper fork and at the other ends upon shoulders carried by the truss rods.

A preferred form of the invention is illustrated in the accompanying drawings in which:

Figure 1 is a side elevation partly broken away of the front end of a bicycle embodying the shock mounted suspension of this invention;

Fig. 2 is an enlarged front elevation as taken from the position 2 in Fig. 1;

Fig. 3 is an enlarged section along the line 3—3 of Fig. 1;

Fig. 4 is an enlarged view taken along the line 4—4 of Fig. 1;

Fig. 5 is a section along the line 5—5 of Fig. 2;

Figure 6:
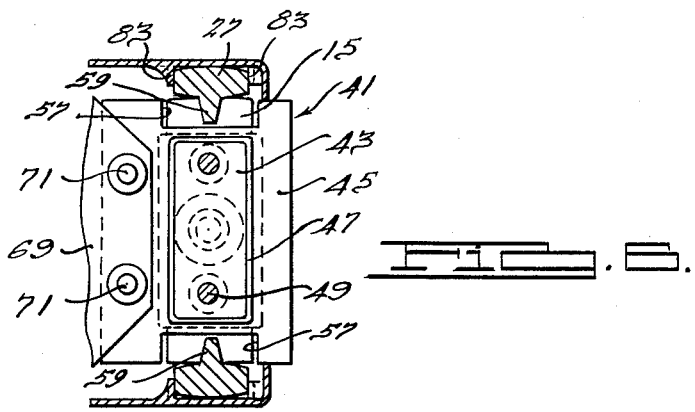
Fig. 6 is a section along the line 6—6 of Fig. 5.
Figure 7:
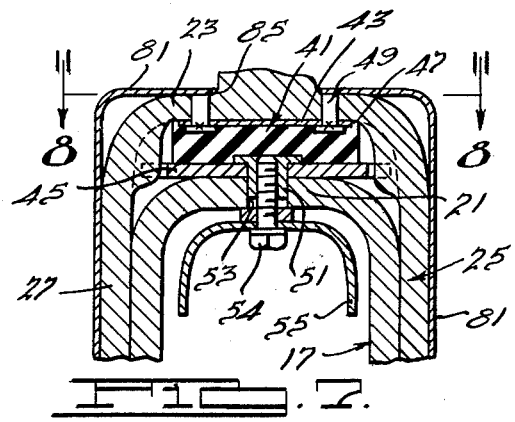
Fig. 7 is a section along the line 7—7 of Fig. 5.
Figure 8:
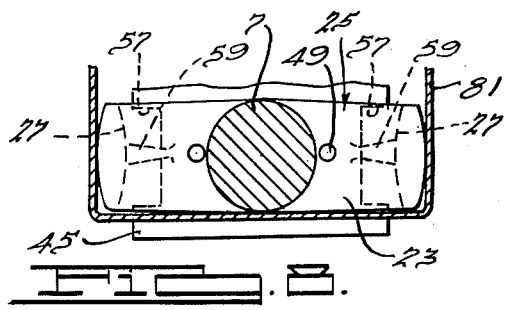
Fig. 8 is a section taken along the line 8—8 of Fig. 7.

The bicycle 1 has a frame 3 which at its front end is provided with a hollow post 5 which, in a conventional manner, rotatably receives the vertical stem 7 of the front end suspension of this invention. The stem 7 will be connected in a known manner to the handle bars of a bicycle so that the front wheel 9 can be turned.

The wheel 9 rotates on a conventional axle 11, the outer ends of which extend through slots 13 at the bottom ends of the legs 15 of a lower forged U-shaped fork 17. Also mounted on the axle 11 are truss rods 19. It will be seen that the legs 15 extend rearwardly of a vertical line through the axle 11 while the truss rods 19 extend forwardly of such a line.

The legs 15 of the fork 17 are joined at their upper ends by a transverse bight section 21 and this is spaced somewhat below the bight section 23 of an upper forged U-shaped fork 25. The bight of fork 25 has the stem 7 as an integral forged part thereof. The legs 27 of the upper fork fit on the outside of the legs 15 and at their bottom ends are provided with apertured bosses 29 that are in alignment with apertures 31 in the legs 15. The openings 29 are provided with pairs of nylon bushings 33 to receive pivot pins 35 that extend through them and are threaded through openings 31 and are firmly fixed in place by nuts 37 threaded on the ends thereof.

It is to be noted that the axis of pivot pins 35 is located above and to the rear of wheel axle 11 and that the wheel 9 can pivot forwardly (clockwise in Fig. 1) or rearwardly about this axis. An impact on the wheel 9 will have a line force defined by the axle 11 and the point of contact of the impact creating obstacle with the wheel. Small bumps encountered by the wheel 9 will have lines of force lying ahead of pin 35 and thus will pivot the wheel forwardly. The weight of the rider and braking on the rear wheel will also pivot the wheel forwardly. On the other hand, larger resistances encountered by the wheel will have lines of force passing to the rear of pins 35 and thus will pivot the wheel 9 rearwardly. These movements of wheel 9, of course, involve relative movement of the upper and lower forks 17 and 25 since fork 25 is a part of the frame and fork 17 is, in effect, a part of the wheel.

The aforementioned relative movement between the upper and lower forks will be yieldably resisted in the present construction so as to minimize or eliminate shock transmitted into the frame of the bicycle and to the rider. The shock eliminating means comprises a rubber shock mount 41 that is disposed in the space between the upper and lower fork bights 23 and 21. The shock mount 41 is a rubber sandwich comprising a relatively small top plate 43, a larger and thicker bottom plate 45, and a generally rectangular body of rubber 47 bonded and adhered to the inside faces of both plates. The top plate 43 has a pair of rivets 49 welded to it, with their heads embedded in the rubber, projecting upwardly to fit in suitable apertures in the bight 23 of the upper fork 25 whereby the rubber mounting 41 is affixed to the fork for movement with it. It will be appreciated that the rivets 49 can be driven out of the fork 25 so that a new shock mount 41 can be inserted if desired. The bottom plate 45 has a central weld nut 51 with a flange welded to the inside face of the plate, the stem of the nut extending through a suitable aperture in the plate and into an aperture 53 in the bight 21 of the lower fork 17. The inside of the nut 51 is threaded to receive a bolt 54 whereby the fender 55 for the front wheel may be secured against a washer in place on the lower fork to move with wheel 9, the bolt 54 also serving to hold the shock mount 41 on the lower fork 17. It is apparent that the rubber mount 41 can be readily removed and replaced by disconnecting it from the upper and lower forks.

The lower plate 45 extends outwardly beyond the sides of the rubber body 47 and is provided with cutouts 57.

Working in the cutouts 57 are inwardly extending ribs 59 formed on the inside of the upper fork 25. It will be seen that the opposite ends of the cutouts 57 will be engaged by the ribs 59 to limit relative pivotal movement of the top fork with respect to the lower fork and prevent overstressing of the rubber. Within the limits permitted by the cutouts 57, such relative pivotal movement will be resisted by shear in the rubber body 47 since the pivotal movement of the lower fork 17 relative to the upper fork 25 causes the bight section 21 to move generally laterally to the spaced but adjacent bight section 23 to absorb and cushion the shock due to loads that tend to change the spacing between the two wheels. Inasmuch as the axis of the pivot pins 35 is offset from the axle 11 of the wheel, all bumps encountered by the front wheel will result in a movement that tends to pivot the inner fork relative to the upper fork about the pivot pins, thus enabling all bumps and shock loads to be dissipated in the rubber body of the mounting 41. The rubber mount 41 will, of course, return the forks to their original aligned position when all load is removed and will cushion any rebound. It should also be noted that because the hinge axis provided by pins 35 is located a considerable distance from mount 41, a greater travel and thus a softer spring rate is provided with a minimum amount of structure and without destroying attractive bicycle lines.

Acting in parallel with the shock mounting 41, is a metal spring system. This includes the pair of flexible truss rods 19 which, as already indicated, are mounted at their lower ends upon the axle 11 and which extend upwardly and forwardly to a corner 61 at which they are bent on a generous radius backwardly toward the rear of the bike in a section 63. The rear end of each section 63 is threaded and attached by nuts 65 in apertures on a flange 67 of a bracket 69 that is attached by bolts 71 to the plate 45, the flange 67 being perpendicular to sections 63. An ornamental device 73 is attached fixedly to both truss rods 19 and provides a pair of rearwardly facing shoulders or stop surfaces 75 which function to fix the position of the forward ends of conical coil springs 77 which are threaded over the truss rods. The large or rear ends of the springs 77 shoulder against apertured faces 79 on a cover 81 through which truss rod sections 63 freely pass, the cover 81 having the bellcrank shape seen in Figure 1 and covering the upper fork 25 to provide a pleasing and ornamental appearance. The cover plate 81 is bolted to the fork as seen in Fig. 3, by the pivot pins 35, and also may have tabs 83 or the like formed therein to attach it in a suitable manner to the upper fork, an aperture 85 being provided for the stem 7. The springs 77 are of such length with respect to the spacing between faces 75 and 79 that they are under initial compression when the bicycle is in the unloaded position of Figs. 1 and 5.

When the wheel 9 tends to move forwardly, as when small resistances are encountered, the faces 75 will move toward faces 79 and compress springs 77 to add their resistance to that of the rubber 47. This will increase the spring rate and automatically adjust the mount to most effectively handle the higher frequencies associated with smaller resistances. The added resistance of springs 77 also will increase the stiffness of the mount to help support the weight of the rider. On the other hand, when the wheel encounters a large resistance, the faces 75 and 79 will move away from each other and after the center or neutral position of the forks has been passed, the release of the initial compression in the springs 77 will act against the resistance of the rubber 47 to lower the spring rate so that the mount automatically adjusts to most effectively handle the lower frequencies associated with the higher resistances.

It will now be realized that we have provided a new and improved shock mounting for the wheel of a bicycle and one which may be readily disassembled so that the parts can be replaced after excessive usage. It is also of such design as to be effective in operation, relatively inexpensive to manufacture, and capable of attractive ornamentation. While we have disclosed our preferred embodiment it will be understood that modifications are within the spirit and scope of the invention, it being within the scope to use features herein disclosed and claimed on a tricycle.

We claim:

1. In a bicycle suspension for shock mounting a bicycle wheel, a member secured to the frame of the bicycle, a second member supporting the bicycle axle, said members being movable relative to each other in either of two opposed directions and having spaced but adjacent portions which move generally laterally relative to one another, a rubber body, means affixing said rubber body to said adjacent portions so that relative movement therebetween in either of said directions is primarily resisted by shear in said rubber body, and metallic spring means connected respectively to said members and acting in conjunction with said rubber body to deflect when said members move relative to each other.

2. A suspension for attaching a bicycle wheel to a bicycle frame, comprising an outer member for attachment to the frame, an inner member pivoted at an intermediate point on its length to the outer member, a rubber shock mounting secured respectively to said inner and outer members to yieldably resist relative pivotal movement, the inner member having means thereon to receive a bicycle wheel axle, an angular flexible truss rod, said truss rod being attached at its upper end to said inner member, the lower end of said truss rod being adapted for connection to a bicycle wheel axle, a spring on said truss rod, and shoulder means on said truss rod and on said outer fork engaging opposite ends of said spring and arranged to cause deflection thereof upon relative pivotal movement of said inner and outer members.

3. The invention set forth in claim 2 including spaced shoulders on one of said members and a projection on the other of said members engageable with said shoulders to limit relative pivotal movement of the members.

4. In a fork assembly for attaching a bicycle wheel to a bicycle frame, a first U-shaped fork having transversely spaced legs joined by a transverse section, a stem projecting upwardly from said transverse section adapted to be received in the steering post of a bicycle frame, a second fork having transversely spaced legs joined by a transverse section at the top ends thereof, said transverse sections being located below the steering post of a bicycle frame and spaced vertically from each other, a rubber shock mount assembly comprising a rubber body and top and bottom plates adhered to said body, the top of said plates fitting on the bottom of said first mentioned transverse sections and being secured to it, said bottom plate being secured to the top of said second mentioned transverse section whereby said rubber body yieldably connects the two forks together, a bicycle wheel having its axle mounted on the lower ends of said fork, truss rods having their lower ends attached to opposite ends of said axle, the said truss rods being of angular shape and extending upwardly and forwardly and then turned to extend rearwardly of the bicycle, means affixing the other ends of said truss rods to said lower fork, means in alignment with said truss rods and attached to said upper fork providing a spring basing surface, means carried by said truss rods providing a second spring basing surface spaced from said first surface, and coil springs on said truss rods confined under compression between said surfaces.

5. The invention set forth in claim 4 wherein said lower plate has cutouts on opposite side edges and said outer fork has ribs disposed in said cutouts to restrict relative movement of the inner and outer forks.

6. The invention set forth in claim 4 wherein said mounting means for said other ends of the truss rods comprises a bracket secured to said bottom plate.

7. The invention set forth in claim 4 including a nut secured to said bottom plate and projecting through said second transverse section, and a fender of a bicycle wheel supported by said nut.

8. The invention set forth in claim 4 wherein said inner and outer forks are pivoted together at a point located substantially below said steering post and to the rear of said axle.

9. In a bicycle having a frame, a front wheel fork for carrying an axle at its lower end to support a bicycle wheel, said fork having an upper end and being pivoted on said frame on an axis intermediate said upper and lower ends, an L-shaped truss rod attached at opposite ends to respectively the upper ends of said fork above said axis and the lower ends of said fork below said axis, coil spring means acting between said frame and said fork to resist pivoting of the fork in one direction and a rubber body yieldably attaching the upper end of said fork to said frame.

10. In a bicycle having a frame, a wheel support, means movably connecting the support to the frame for movement in opposite directions, said frame and support having spaced but adjacent portions that move generally laterally relative to one another, a resilient body disposed between and affixed to said adjacent portions to continuously resist said lateral movement, and second spring means between said support and frame acting to resist said movement in one direction and to assist said movement in the opposite direction.

11. In a suspension for pivotally attaching a bicycle front wheel to a bicycle frame having spring means for resisting relative movement between the front wheel and frame in a manner to support the weight of the rider, an outer fork attached to the frame, an inner fork movably mounted on the outer fork, means at an end of the inner member for rotatably supporting a bicycle wheel, and a rubber shock absorber comprising a body of rubber secured between two plates, means on each of said plates removably attaching it to spaced adjacent portions of each of said forks which move substantially laterally to one another, the movement between said forks being primarily resisted by shear in said rubber body whereby said rubber shock absorber can cooperate with the spring means supporting the main weight of the rider to provide a smooth comfortable riding action.

12. In a bicycle having a frame, a front wheel fork for carrying an axle at its lower end to support a bicycle wheel, means for pivotally connecting said fork to said frame, said fork and frame having spaced but adjacent portions which move generally laterally relative to one another in response to the pivotal movement of the fork relative to said frame, a rubber body disposed between and affixed to said adjacent portions to continuously resist said lateral movement primarily by shear in the rubber body, and spring means acting between said frame and said fork to resist pivoting of the fork in a direction wherein the wheel supported by said wheel support moves away from the other wheel of said bicycle.

References Cited in the file of this patent

UNITED STATES PATENTS

| 2,160,034 | Schwinn | May 30, 1939 |
| 2,202,615 | Barenyi | May 28, 1940 |
| 2,272,270 | Krotz | Feb. 10, 1942 |
| 2,307,279 | Kranz | Jan. 5, 1943 |
| 2,540,585 | Kranz | Feb. 6, 1951 |
| 2,561,156 | Thorkildsen | July 17, 1951 |
| 2,590,050 | Smith | Mar. 18, 1952 |

FOREIGN PATENTS

| 100,909 | Sweden | Feb. 18, 1941 |
| 534,584 | Great Britain | Mar. 11, 1941 |
| 757,673 | Germany | July 24, 1952 |
| 1,115,592 | France | Jan. 9, 1956 |